June 17, 1969 J. E. MacDOWELL 3,450,844

FREQUENCY SELECTIVE CONTROL CIRCUIT

Filed Nov. 26, 1965

INVENTOR
JAMES E. MACDOWELL by: Wolfe, Hubbard, Voit & Osann
ATTYS.

United States Patent Office 3,450,844
Patented June 17, 1969

3,450,844

FREQUENCY SELECTIVE CONTROL CIRCUIT

James E. MacDowell, Lawrenceville, Ill., assignor to Suttle Corporation, a corporation of Illinois Filed Nov. 26, 1965, Ser. No. 509,880
Int. Cl. H04m 1/00, 3/56
U.S. Cl. 179—84 3 Claims

ABSTRACT OF THE DISCLOSURE

A telephone ringing circuit responsive to a particular ringing frequency is described in which a normally closed relay and a twin-T selective frequency rejection network which cause all but a given predetermined ringing frequency to open the normally closed relay and disconnect the ringing device.

This invention relates generally to frequency-responsive control circuits. More particularly, this invention relates to telephone ringing circuits for use in the selective ringing of individual telephones in party-line systems.

In the early days of party-line telephone service, all of the subscribers on a given line were obliged to pay close attention each time their telephones rang, to determine by the ringing sequence if the call was intended for them. This was essential in order to insure that a call should not be missed, even though it meant that every telephone on a given line would ring when any individual subscriber was being called. To eliminate this inconvenience, systems have been developed which will ring only the particular party-line subscriber who is being called, the other telephones on the line remaining silent. This result is often achieved through the use of electro-mechanical devices incorporating vibrating reeds which will oscillate when energized by a ringing signal of a certain frequency and thereby actuate a switch within the subscriber's set which connects the set's bell to the ringing voltage and causes it to sound. Disadvantages of these vibrating-reed systems are that they are bulky, difficult to adjust, and susceptible to damage from shock and other causes, making then unreliable and unsuitable for installation within the telephone receiver itself.

It is therefore a primary object of this invention to provide an improved frequency selective control circuit for a telephone ringing system which selectively energizes a normally connected electrical load in response to a particular signal frequency by removing the load from the circuit in response to signals of other than the selected frequency.

Another object is to provide a frequency selective control circuit of the foregoing type which has highly selective frequency response characteristics and is able to accurately distinguish between commonly used ringing frequencies.

A further object is to provide a control circuit of the above description for telephone ringing purposes which is shock-resistant, derives its power from the ringing signal itself, and is small enough to be installed within the base of a conventional telephone receiver.

Other objects and advantages of the invention will become apparent upon reading the following detailed description and upon reference to the drawings. In the drawings, the invention is illustrated in connection with a telephone ringing circuit such as would be used in a party-line system.

While the invention will be described in connection with a preferred and an alternative embodiment, it will be understood that I do not intend to limit the invention to those embodiments, but intend to cover all equivalents, modifications, and alternative embodiments as may be included within the spirit and scope of the invention as defined by the appended claims.

Figure 1:
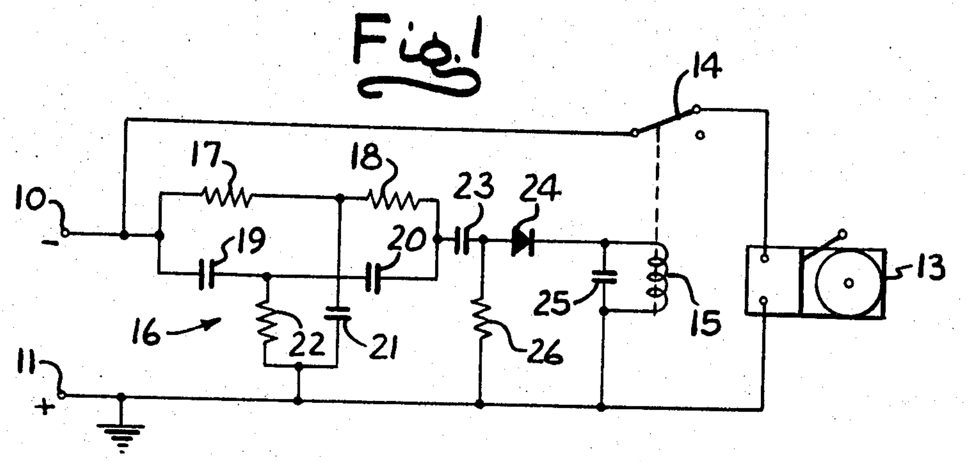
FIGURE 1 is a schematic circuit diagram of one embodiment of the invention.

Turning now to the drawings, there is shown in FIGURE 1 a schematic diagram of the invention in a form which would be used in a simplified telephone ringing circuit. One input terminal 10 of the device is connected to one of the two conductors of the telephone trunk line (not shown). The other input terminal 11 is connected to the ground conductor of the trunk line. Also connected across the terminals 10, 11 is a bell or other electrically actuated alarm device 13, with the bell circuit being controlled by a relay 14 having an actuating coil 15. The bell circuit is completed when the relay 14 is in its normal, or rest position. When the relay 14 is actuated, the bell circuit is broken. The bell 13 is of a type commonly used in telephone circuits, being responsive to ringing frequencies in a range generally between 15 and 60 cycles per second at a conventional ringing voltage of approximately 75 to 120 volts, measured at the central generator. The ringing voltage is also applied to the control circuit from the trunk line through the input terminals 10, 11.

If the relay 14 were not actuated to break the bell circuit, any ringing voltage appearing across the input terminals 10, 11 would result in sounding of the bell 13. In accordance with the invention, the bell 13 is made to respond only to a certain predetermined frequency by the selective actuation of the relay 14 whenever a different frequency appears at the input terminals 10, 11. This is achieved through the use of a twin-T frequency selective network 16. The twin-T network 16 consists of two parallel T branches, one of which comprises two serially connected resistors 17, 18, and the other of which comprises two serially connected capacitors 19, 20. A capacitor 21 is connected between the junction of the two resistors 17, 18 and ground, and a resistor 22 is connected between the junction of the two capacitors 19, 20 and ground. The twin-T network 16 has the ability to reject, or not transmit, a certain predetermined frequency with a high degree of selectivity, with the value of the rejected frequency depending on the values chosen for the circuit elements comprising the network 16. The degree of attenuation of the selected frequency will also depend on the values chosen for the circuit elements and can theoretically be infinite, although in practice figures of between −50 to −60 decibels are generally realized. Since twin-T networks per se are well known, it is unnecessary to go into the theoretical aspects of their operation.

In carrying out the invention, the elements of the twin-T network 16 are chosen such that the resonant or rejected frequency coincides with one of the several ringing frequencies generally used in the telephone system. The frequencies used are below the range of frequencies to which the telephone receiver is responsive, so that the user cannot hear the ringing signal. Ringing signals are commonly found within the range of 15 to 60 cycles per second, with five different ringing frequencies being generally used for each trunk line conductor. The combination of two trunk line conductors with a common ground thus allows a total of ten different frequencies for each party line, so that up to ten subscribers may be rung individually.

In the embodiment illustrated in FIG. 1, the output of the twin-T network is passed through a D.-C. blocking capacitor 23 and rectified so that it may be used to actuate a relay of the D.-C. type. D.-C. relays are preferred because of the advantages of small size and low power dissipation which they offer. They may be actuated with currents as low as 4 ma., allowing the rest of the circuit to be designed with relatively high impedance in order to provide for low overall power dissipation in the control circuit. In practice, an impedance of 500 ohms has been successfully used for the twin-T network. Rectification of the network output is accomplished by a diode 24 and a filter capacitor 25. An additional resistor 26 is provided to furnish a D.-C. return for the diode 24, although its value is made sufficiently high to provide a minimum of loading on the twin-T network 16.

The twin-T network has been found to provide highly selective operation of the relay 14 in response to varying input ringing frequencies. At a ringing frequency of 20 c.p.s., it has been observed that a twin-T network designed to operate at this point will result in the power supplied to the relay at frequencies of 18 c.p.s. and 21 c.p.s. being only half that supplied at the design frequency. Expressed in terms of attenuation, there has been observed to be a 40 db separation between the ringing channels or frequency bands used in conventional party-line telephone systems. It has also been observed that for a ringing frequency other than that for which the particular circuit is designed to respond, the response of the relay 14 in breaking the bell circuit is so nearly instantaneous that no sound may be heard, even though the bell circuit is closed at the instant the signal is applied. The time required for the circuit to detect a ringing signal of an undesired frequency and to disconnect it from the bell circuit has been found to be less than 0.07 second, a period of time which is insufficient for the bell to be operated by a full cycle of the alternating ringing voltage at the ringing frequencies with which the system would be used.

An advantage of the present invention is that a control circuit constructed according to the invention may be made compact enough to be installed entirely within the base of a telephone receiver. The low power dissipation requirements allow use of resistors, capacitors and other circuit components sufficiently small to fit within a space measuring less than 3 by 2½ by 1½ inches. The only moving part within the circuit is the armature of the relay 14, which relay can be made rugged enough to withstand the abuses encountered in mounting the unit within a telephone receiver. Because the frequency responsive elements within the unit are wholly electrical in nature, no mechanical tuning adjustments are required once the unit is assembled and installed. In addition, the cost of components for a circuit constructed according to the invention is only a few dollars per unit.

Figure 2:
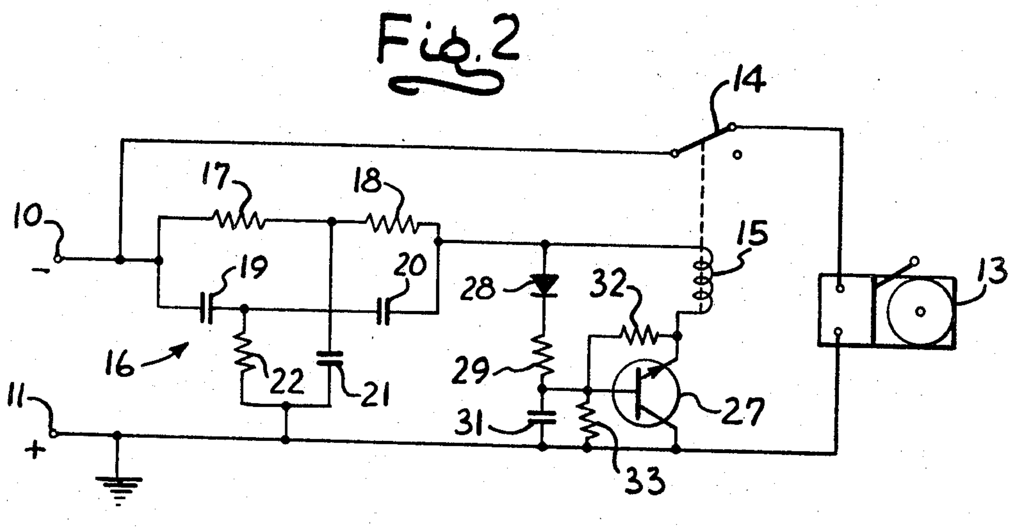
FIG. 2 is a schematic circuit diagram of an alternative embodiment of the invention.

The preferred embodiment of the invention, illustrated in FIG. 2 makes use of the same twin-T network as did the embodiment previously described, but with the addition of a transistor 27 and associated circuitry for the control of the current through the relay 14. In this embodiment, the transistor 27 serves as a switch for controlling the flow of current through the relay coil 15, and is itself controlled by a signal derived from the output of the twin-T filter network 16. The output of the twin-T network 16 is rectified by the diode 28 connected to ground through a loading resistor 29 and a capacitor 31. The rectified signal is then applied to the base of the transistor 27, which is thereby driven to saturation for all input signals of other than the desired frequency. The collector voltage required for the operation of the transistor 27 is obtained from the normal D.-C. bias given to the telephone conductors at the telephone central office for operation of the telephones, which is about 48 volts. This bias appears across the input terminals 10, 11 as a constant potential, upon which the alternating ringing voltage is impressed. The base bias of the transistor 27 is obtained from a biasing network comprising two resistors 32, 33. It may be appreciated that in this embodiment, the use of the transistor 27 for controlling current through the relay coil 15 permits the use of a twin-T filter network 16 having a very high impedance, resulting in an extremely small amount of power absorbed and dissipated in the control circuit. Many such control circuits may then be used on a given party line and the total power drain caused by their use will be only a negligible fraction of the power available at the ringing generator, which generally can supply between 50 and 100 watts.

I claim as my invention:

1. In a telephone system, including a carrier conductor and a ground conductor and electrical ringing means responsive to an A.-C. ringing signal, the improvement comprising a frequency responsive control circuit including a relay, which relay when not energized connects said ringing signals to said ringing means and when energized disconnects said ringing signals from said ringing means, and a twin-T filter network, which network directs all signals except those of a preselected frequency to actuate said relay.

2. The improvement of claim 1 in which said twin-T filter network directs all signals except those of a predetermined frequency to a means including a transistor for signal amplifying and thereafter to actuate said relay.

3. The improvement of claim 1 in which said twin-T filter directs all signals except those of a predetermined frequency to a means including a transistor and a diode for signal amplifying and rectifying and thereafter to actuate said relay, which relay is of the D.-C. type.

References Cited

UNITED STATES PATENTS

| | | | |
|---|---|---|---|
| 2,957,950 | 10/1960 | Holman et al. | 179—17 |
| 3,300,589 | 1/1967 | Carter | 179—87 |

FOREIGN PATENTS

| | | |
|---|---|---|
| 677,734 | 1/1964 | Canada. |

KATHLEEN H. CLAFFY, *Primary Examiner.*

A. H. GESS, *Assistant Examiner.*

U.S. Cl. X.R.

179—17